Figure 1:
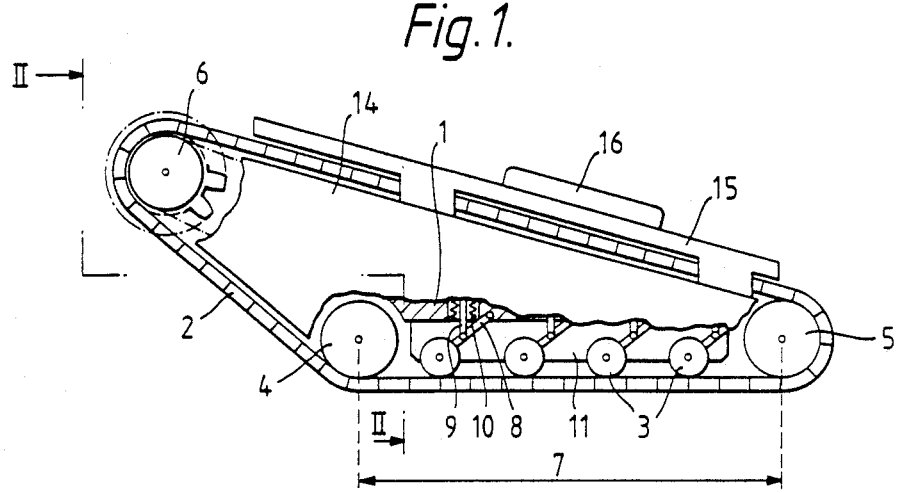

United States Patent [19]

King et al.

[11] Patent Number: 4,825,969
[45] Date of Patent: May 2, 1989

[54] WIDE TRACK VEHICLE

[75] Inventors: David W. King, Hampshire; Peter J. Gibson, Surrey, both of England

[73] Assignee: The Secretary of State for Defence in Her Majesty's Government of the United Kingdom of Great Britain and Northern Ireland, London, England

[21] Appl. No.: 91,067

[22] PCT Filed: Oct. 27, 1986

[86] PCT No.: PCT/GB86/00665
§ 371 Date: Aug. 7, 1987
§ 102(e) Date: Aug. 7, 1987

[87] PCT Pub. No.: WO87/02636
PCT Pub. Date: May 7, 1987

[30] Foreign Application Priority Data

Oct. 29, 1985 [GB] United Kingdom ............... 8526602

[51] Int. Cl.$^4$ ............................................. B62D 55/104
[52] U.S. Cl. ........................................ 180/9.1; 305/16; 305/24; 305/35 EB
[58] Field of Search ................ 180/9, 9.1, 9.23, 9.22, 180/9.28, 9.32, 6.48; 305/35 EB, 35 R, 38, 60, 12, 11, 13, 21, 24, 16

[56] References Cited

U.S. PATENT DOCUMENTS

| 1,964,637 | 6/1934 | Hurxthal | 305/12 U X |
| 3,236,568 | 2/1966 | Bombardier et al. | 305/12 |
| 3,418,961 | 12/1968 | Gregg | 180/9.1 X |
| 3,837,714 | 9/1974 | Russ, Sr. | 305/24 |
| 4,042,282 | 8/1977 | Haslett et al. | 305/11 |
| 4,198,103 | 4/1980 | Ward et al. | 180/9.1 X |

FOREIGN PATENT DOCUMENTS 519407 2/1931 Fed. Rep. of Germany ........ 305/12

Primary Examiner—Charles A. Marmor
Assistant Examiner—Mitchell J. Hill
Attorney, Agent, or Firm—William R. Hinds

[57] ABSTRACT

A wide track vehicle with improved skid steering by having a chassis (1) supported upon two independently drivable tracks (2) by side support wheels (3) engaged with each track adjacent the outer edges only. Downwardly projecting rubbing strips (11, 12, 13) are attached to the underside of the chassis (1) to engage slideably with each track only when the track is upwardly deflected by uneven terrain. The tracks (2) each rotate upon a plurality of full width direction-changing rollers attached to the chassis and each having a rolling surface which is provided with mud-cutting, helical ridges (18).

7 Claims, 1 Drawing Sheet

WIDE TRACK VEHICLE

TECHNICAL FIELD OF THE INVENTION

This invention relates to a tracked vehicle suitable for unmanned deployment in hostile environments.

BACKGROUND ART

The mobility of an unmanned vehicle is extremely dependent upon the terrain, obstacles in the path of the vehicle causing various mobility failures such as overturning, gross slippage, nose-in failure and hang-up failure, the latter two being caused by engagement of the nose and belly respectively of the vehicle with the terrain.

Wide track manned vehicles having tracks extending substantially the full width of the vehicle are known for use on relatively even terrain. The tracks of such vehicles fully cover the belly and hence would be suitable for eliminating the possibility of hang-up failure were it not for the steerage problems engendered in use on uneven terrain by the mode of steering that has to be employed, ie skid steering.

Skid steering comprises the application of a velocity differential to the two independently drivable, parallel tracks of the vehicle, which application causes the tracks to skid about a pivot axis trajectory, the location of which is determined both by the velocity differential applied and by the load distribution of the vehicle upon the tracks. When the tracks are wide and the terrain is uneven it becomes difficult to predict where ground contact will take place, with consequent unpredictability of loads and rates of turn during steering.

The present invention seeks to provide a wide track vehicle with improved skid steering on uneven terrain.

THE INVENTION

Accordingly, the present invention comprises a tracked vehicle having a chassis supported on two independently drivable, parallel tracks, together extending substantially the full width of the chassis so as to cover substantially the whole belly thereof, wherein the chassis is supported upon a plurality of side support wheels, engageable with an inner face of each track adjacent the outer edge thereof, at least one longitudinally disposed rubbing strip being located inwardly of each plurality of support wheels and having less downward projection than the support wheels, thereby to be slideably engageable with the inner face of the track only when the underlying track is upwardly deflected by uneven terrain.

Preferably a parallel plurality of the said rubbing strips is provided inwardly of each plurality of side support wheels, each strip being of progressively reducing downward projection with increasing proximity to the centre line of the vehicle.

In order to maintain the geometry of the track, full width, direction changing rollers are provided at each turning point of each track, ie, where the tracks change direction. Each of these full width rollers has a rolling surface which is preferably provided with axially inclined ridges or blades in order to avoid build up of mud or clay deposits between the rollers due to low contact pressure.

The maximum height of obstacle that can be mounted by the vehicle is of course dependent upon the length of the ground engageable portion of the tracks, ie, track-base, defined by the spacing of the lower, full width, direction changing rollers, ie the road rollers. A preferred arrangement for unmanned use is provided with three only direction changing rollers comprising two road rollers and one drive sprocket roller. This arrangement is advantageous over conventional four-roller arrangements of manned tracked vehicles, both in providing a longer track base and in shifting the centre of gravity of the vehicle forward, thereby providing a vehicle which will behave well in either a forwards or a backwards direction.

Where the vehicle is intended for unmanned use, the chassis and drive mechanisms mounted thereon are contained entirely within the perimeter of the tracks. Access to the drive mechanisms may be achieved by a drawer system, ie the various components being slideably mounted on runners transverse to the longitudinal centre line of the vehicle. The chassis may also be enclosed within a body and provided with a top hamper bridging the tracks, upon which various terrain sensors and control units may be mounted.

SPECIFIC EXAMPLE OF THE INVENTION

Figure 2:
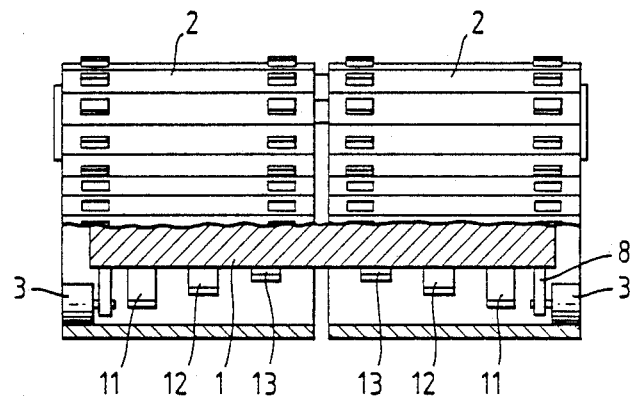
Figure 3:
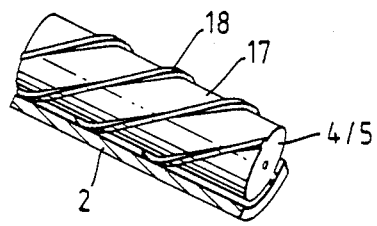

An embodiment of the invention will now be described by way of example only with reference to the accompanying drawings, of which FIG. 1 is a part cut-away diagrammatic side elevation of an unmanned tracked vehicle, FIG. 2 is a front view of the same vehicle part-sectioned on line II—II of FIG. 1, and FIG. 3 is a perspective view of a full width, direction changing roller used in the vehicle of FIG. 1.

The tracked vehicle illustrated in FIG. 1 is intended for unmanned use and comprises a chassis 1 supported on each of two independently drivable, half width tracks 2 by four side support wheels 3 engaged with the inner face of each track 2 adjacent the outer edge thereof. Each track 2 rotates about three full width direction changing rollers 4, 5 and 6, the two lower rollers 4 and 5 defining a track base 7 and the upper roller 6 comprising a drive sprocket roller disposed forwardly of the lower roller 4.

Each side support wheel 3 is attached to the chassis 1 by a pivoted arm 8 and urged against the track 2 by a suspension member 9 and a compression spring 10.

Attached to the underside of the chassis 1 inwardly of each set of side support wheels 3 are three longitudinally extending, low friction, rubbing strips 11, 12 and 13, each having a progressively reduced downward projection with increased proximity to the centre line of the vehicle. These rubbing strips 11, 12 and 13 carry the vehicle load only when crossing an obstacle, ie when the tracks 2 are deflected upwardly by an underlying obstacle interjacent the two sets of side support wheels 3, each strip coming consecutively into engagement with the track 2 as track deflection is increased by the obstacle.

The chassis 1, which is disposed entirely within the periphery of the tracks 2, supports a body 14 within which drive mechanisms (not shown) for the drive sprocket rollers 6 are contained. The body 14 also carries a top hamper 15 bridging the two tracks 2, upon which top hamper electronic drive control means 16 are mounted together with any other ancillary equipment that may be required for specific applications of the unmanned vehicle.

The control means 16 includes sensors, analysers and motivators (not shown) arranged either for remote command or for command by a pre-programmed computer also included in the control means 16, so as to make the vehicle autonomous.

The vehicle is steered by application of a velocity differential to the two independently drivable tracks 2, ie by conventional skid steering but, because the weight of the vehicle is carried only at the outer edge of each track in normal running, the steering is more predictable than that of conventional wide track vehicles.

The concentration of vehicle loading onto the side support wheels 3 engenders low contact pressure between the full width, direction changing rollers 4 and 5 and the track, a condition which permits mud to pack between the track and the roller, leading to track throwing if allowed to prevail.

A solution to this problem is illustrated in FIG. 3, which figure depicts a direction changing roller 4/5 having a rolling surface 17 provided with a plurality of mud cutting, helical ridges 18 engaged with the track 2. These ridges 18 provide a reduced contact area with the track 2 and a consequently increased contact pressure over that area, enabling the ridges to cut through any mud deposits interjacent the roller and the track. The helical form of the ridges 18 ensures that the thus partitioned deposits are ejected, by rotation of the roller, from the ends of the roller.

The embodiment of the invention herein described is an unmanned vehicle suitable for a range of purposes such as decoy, surveillance, supply or sentry duties in hazardous environments. However it will be obvious to those skilled in the art that the invention is also advantageously applicable to manned, wide track vehicles in order to improve the predictability of skid-steering.

We claim:

1. A tracked vehicle having a chassis (1) supported on two independently drivable, parallel tracks (2), together extending substantially the full width of the chassis so as to cover the belly thereof, wherein the chassis (1) is supported upon a plurality of side support wheels (3) engageable with an inner face of each track adjacent the outer edge only thereof, at least one longitudinally disposed rubbing strip connected to the belly of the vehicle chassis being located inwardly of each plurality of support wheels (3) and having less downward projection than the side support wheels, thereby to be slideably engageable with the inner face of the track only when the underlying track is upwardly deflected by uneven terrain.

2. A tracked vehicle as claimed in claim 1 wherein the chassis (2) is provided with a parallel plurality of the said rubbing strips (11, 12, 13) located inwardly of each plurality of side support wheels (3), each strip being of progressively reduced downward projection with increased proximity to the centre line of the vehicle.

3. A tracked vehicle as claimed in claim 1 wherein each track (2) rotates upon a plurality of full width, track-direction-changing rollers (4, 5) each having a rolling surface (17) provided with a plurality of helical, mud cutting ridges (18) engageable with the said inner surface of the track (2).

4. A tracked vehicle as claimed in claim 2 wherein each track (2) rotates upon a plurality of full width, track-direction-changing rollers (4, 5) each having a rolling surface (17) provided with a plurality of helical, mud cutting ridges (18) engageable with the said inner surface of the track (2).

5. A tracked vehicle having a chassis supported on two independently drivable, parallel tracks, together extending substantially the full width of the chassis so as to cover the belly thereof, wherein the chassis is supported upon a plurality of side support wheels engageable with an inner face of each track adjacent the outer edge only thereof, a plurality of longitudinally disposed, laterally spaced, parallel rubbing strips being located inwardly of each plurality of support wheels and having less downward projection than the side support wheels, each strip being of progressively reduced downward projection with increased proximity to the centre line of the vehicle thereby to be slideably engageable with the inner face of the track only when the underlying track is upwardly deflected by uneven terrain.

6. A tracked vehicle as claimed in claim 5 wherein each track rotates upon a plurality of full width, track-direction-changing rollers each having a rolling surface provided with a plurality of helical, mud cutting ridges engageable with the said inner surfaces of the track.

7. A tracked vehicle having a chassis supported on two independently drivable, parallel tracks, together extending substantially the full width of the chassis so as to cover the belly thereof, wherein the chassis is supported upon a plurality of side support wheels engageable with an inner face of each track adjacent the outer edge only of each track such that the weight of the vehicle is principally carried only at the outer edge of each track in normal running on relatively even terrain and the track portions inwardly of the support wheels and extending to the inner edges of the tracks are substantially unsupported against upward movement so as to be deflected upwardly when passing over uneven terrain, at least one longitudinally disposed rubbing strip being located inwardly of each plurality of support wheels and having less downward projection than the side support wheels, thereby to be slideably engageable with the inner face of the track only when the underlying track is upwardly deflected by uneven terrain.

* * * * *